April 22, 1947. J. G. LEE 2,419,456
TAILLESS AIRPLANE ARRESTING HOOK
Filed May 4, 1943
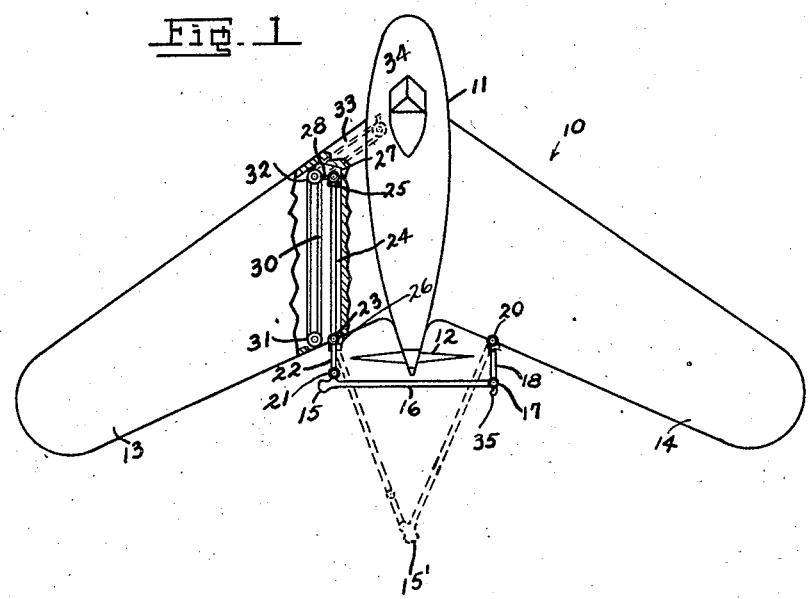
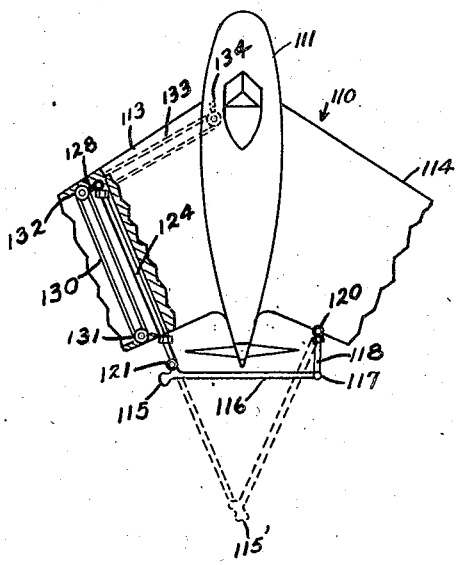
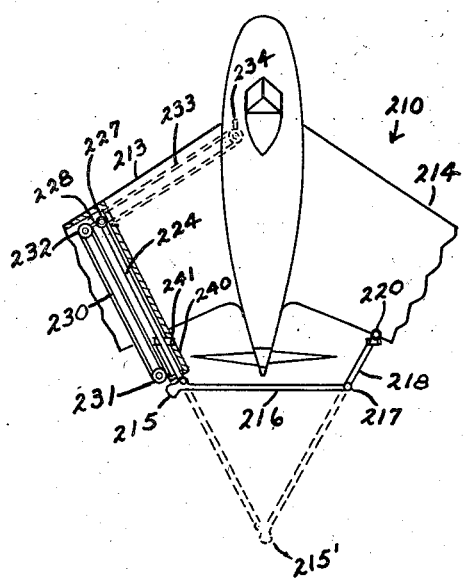
INVENTOR
John G. Lee Patented Apr. 22, 1947

2,419,456

UNITED STATES PATENT OFFICE 2,419,456

TAILLESS AIRPLANE ARRESTING HOOK

John G. Lee, Farmington, Conn., assignor to United Aircraft Corporation, East Hartford, Conn., a corporation of Delaware Application May 4, 1943, Serial No. 485,668

8 Claims. (Cl. 244—110)

This invention relates to an arresting hook for a tailless airplane, and has for an object to provide an arresting hook particularly adapted for use on airplanes of the type which does not have a conventional tail.

A further object of this invention is to provide an arresting hook that may be applied to an airplane lacking the usual tail where the arresting hook for enabling the plane to land on an aircraft carrier or other limited landing area is conventionally located.

A further object of this invention is to provide an arresting hook for a tailless airplane of the pusher-propeller type.

Still a further object of this invention is to provide an arresting hook for a tailless airplane wherein the arresting hook may be retracted partly into the plane where it affords the least aerial dynamic disturbance while in flight, and which is capable of being extended to the arresting position when the plane is about to be landed on an aircraft carrier or other landing field of limited area which is provided with the usual transverse retarding cables.

With the foregoing and other objects in view, the invention consists in the construction, combination and arrangement of parts hereinafter described and illustrated in the drawings, in which:

Fig. 1 shows one form of the arresting hook of this invention;

Fig. 2 shows a slightly modified form of the invention; and

Fig. 3 is a still further modified form of the invention.

There is shown at 10, in Fig. 1, a conventional representation of a pusher-propeller type of tailless airplane, provided with a fuselage 11 having its pusher-propeller 12 extending rearwardly between the V formed by its wings 13 and 14. The arresting hook 15 forming this invention is formed on the end of an arm 16 which is hinged at 17 to a stub arm 18 which, in turn, is pivoted at 20 to a support within the wing 14. At the hook end 15 of the arm 16 a hinge 21 is provided connecting it to a stub arm 22 which, in turn, is joined at 23 to a long arm 24, provided adjacent its other end with a collar 25 for cooperation with a collar 26 secured to a support in the wing 13 and limiting the extension of the arm 24 therethrough. The extreme end 27 of the arm 24 is secured by a link 28 to an endless cable 30 passing around a pulley 31 adjacent the collar 26 and around a control double pulley 32 around which also passes a control cable 33 from a hand crank 34 in the fuselage 11 adjacent the pilot's location. The stub arm 18 is provided with an extension finger 35 against which the arm 16 may abut and lock when hook 15 has been extended to the arresting position shown at 15'.

In operation, when the pilot is ready to land the airplane 10 on an aircraft carrier or landing field of limited area provided with the customary transverse retarding cable, he operates the crank handle 34 rotating the double pulley 32 and causes the cable 30 to move the end of arm 24 until the collar 25 abuts against the cooperating collar 26 at the edge of wing 13, the joints 23 and 17 permitting such action and enabling the arresting hook 15 to move from its stored position at 15 to its operative arresting position at 15'. When in this position the hook 15 is capable of developing movement transverse to the plane of the airplane because the pivot 20 and the collar 26 are of such structure as to permit such movement.

The form of the invention shown in Fig. 2 differs from that shown in Fig. 1 only in that the arm 124 extends through the wing 113 of the airplane 110 in such direction that its hinge end 121 attached to the hook 115 moves in a straight line in moving the hook 115 to the position 115'. Otherwise the construction of this form of the invention is substantially the same as in Fig. 1, the hook 115 being at the end of the arm 116, hinged at 117 to the stub arm 118, which is pivoted at 120 to the wing 114. As a result of this straight line movement of the arm 124, the arm 124 eliminates the necessity for any stub corresponding to the stub 22 and its pivot 23. The arm 124 is extended and retracted by means of a link 128 connected to the cable 130 extending about the pulley 131 and double pulley 132 connected by the cable 133 to the crank arm 134 located convenient to the pilot's position in the fuselage 111.

In the form of the invention applied to the airplane 210, shown in Fig. 3, the wings 213 and 214 are not as wide as the wings 113 and 114 of Fig. 2. In this case a guideway tube 240 is pivoted at 241 to the rear edge of the wing 213, thereby enabling the arm 224 to extend the hook 215 to the position 215'. This hook 215 is provided at the end of the arm 216, hinged at 217 to the stub arm 218, and pivoted at 220 to the rear end of wing 214. A control cable 230 is connected with a link 228 to the end of the arm 224. Control cable 230 is manipulated in the same manner as in the other forms of the invention by means of the cable 233 extending through the double pulley 232 and to the crank arm 234.

The other pulley 231 for the cable 230 is mounted adjacent the end of the extension guideway tube 240, it being obvious that when the end 227 of arm 224 has been moved to a position in the extension guideway tube 240 beyond the joint 241 that the hook 215 in end 215' may move in a direction about the line X—X as a center about the pivot points 220 and 241, the cable 230 being flexible and permitting such angular motion.

Other modifications and changes in the number and proportions of the parts may be made by those skilled in the art without departing from the nature of this invention within the scope of what is hereinafter claimed.

Having thus set forth and disclosed the nature of this invention, what is claimed is:

1. An arresting hook for a tailless airplane comprising a jointed arm hinged adjacent the rear edge of one wing and a second arm, one end of which is hinged to the other end of the jointed arm and the other end of which is lined to a control means extending through the other wing of the tailless airplane for extending and retracting said second arm from said wing, and an arresting hook element on one of said arms adjacent the pivot between such arms.

2. An arresting hook for a tailless airplane comprising a jointed arm hinged adjacent the rear edge of one wing and a second arm, one end of which is hinged to the other end of the jointed arm and the other end of which is linked to a control means extending through the other wing of the tailless airplane for extending and retracting said second arm from said wing, an arresting hook element on one of said arms adjacent the pivot between such arms, and means at the joint of said jointed arm limiting the relative movement of the jointed portions of said jointed arm.

3. An arresting hook for a tailless airplane comprising a V member, a hook formed at the apex of said V, one arm of said V being pivotally secured to the rear edge of one wing of the airplane, the other arm of said V being pivotally secured adjacent the rear edge of the other wing of said airplane, one of said V arms being retractable into the body of the wing to which it is pivotally secured.

4. An arresting hook for a tailless airplane comprising a V member, a hook formed at the apex of said V, one arm of said V being pivotally secured to the rear edge of one wing of the airplane, the other arm of said V being pivotally secured adjacent the rear edge of the other wing of said airplane, one of said V arms being retractable into the body of the wing to which it is pivotally secured, and means under the control of the pilot for extending and retracting said retractable V arm to and from arresting hook position.

5. An arresting hook for a tailless airplane comprising a V member, a hook formed at the apex of said V, one arm of said V being pivotally secured to the rear edge of one wing of the airplane, the other arm of said V being pivotally secured adjacent the rear edge of the other wing of said airplane, one of said V arms being retractable into the body of the wing to which it is pivotally secured, the other arm of said V being non-retractable, and a joint formed in said non-retractable arm permitting it to bend as said retractable arm is retracted.

6. An arresting hook for a tailless airplane comprising a V member, a hook formed at the apex of said V, one arm of said V being pivotally secured to the rear edge of one wing of the airplane, the other arm of said V being pivotally secured adjacent the rear edge of the other wing of said airplane, one of said V arms being retractable into the body of the wing to which it is pivotally secured, and means under the control of the pilot for extending and retracting said retractable V arm to and from arresting hook position, said retractable arm being retractable in a direction in alignment with its extended position.

7. An arresting hook for a tailless airplane comprising a V member, a hook formed at the apex of said V, one arm of said V being pivotally secured to the rear edge of one wing of the airplane, the other arm of said V being pivotally secured adjacent the rear edge of the other wing of said airplane, one of said V arms being retractable into the body of the wing to which it is pivotally secured, means under the control of the pilot for extending and retracting said retractable V arm to and from arresting hook position, said retractable arm being retractable into its wing at an angle to its position when extended, and a joint in said retractable arm permitting it to bend while being retracted and extended.

8. An arresting hook for a tailless airplane comprising a V member, a hook formed at the apex of said V, one arm of said V being pivotally secured to the rear edge of one wing of the airplane, the other arm of said V being pivotally secured adjacent the rear edge of the other wing of said airplane, one of said V arms being retractable into the body of the wing to which it is pivotally secured, means under the control of the pilot for extending and retracting said retractable V arm to and from arresting hook position, said retractable arm being retractable in a direction in alignment with its extended position, a guideway extending through the wing into which said retractable arm is retracted, said guideway having a portion extending beyond said wing, and a joint permitting said extended portion and said extended arm to pivot.

JOHN G. LEE.

REFERENCES CITED

The following references are of record in the file of this patent:

UNITED STATES PATENTS

| Number | Name | Date |
|---|---|---|
| 1,915,055 | Fauvel | June 10, 1933 |

FOREIGN PATENTS

| Number | Country | Date |
|---|---|---|
| 794,924 | French | Dec. 26, 1935 |